US011933969B2

(12) United States Patent
Masuda et al.

(10) Patent No.: US 11,933,969 B2
(45) Date of Patent: Mar. 19, 2024

(54) OPTICAL ENGINE MODULE

(71) Applicant: MEGA1 COMPANY LTD., New Taipei (TW)

(72) Inventors: Makoto Masuda, New Taipei (TW); Han-Chiang Wu, New Taipei (TW); Shan-Ling Yeh, New Taipei (TW); Tzu-Chieh Lien, New Taipei (TW)

(73) Assignee: MEGA1 COMPANY LTD., New Taipei (TW)

( * ) Notice: Subject to any disclaimer, the term of this patent is extended or adjusted under 35 U.S.C. 154(b) by 545 days.

(21) Appl. No.: 17/333,125

(22) Filed: May 28, 2021

(65) Prior Publication Data

US 2021/0373323 A1 Dec. 2, 2021

Related U.S. Application Data

(60) Provisional application No. 63/120,206, filed on Dec. 2, 2020, provisional application No. 63/031,588, filed on May 29, 2020.

(51) Int. Cl.
*G02B 26/08* (2006.01)
*G02B 26/10* (2006.01)
(Continued)

(52) U.S. Cl.
CPC ....... *G02B 26/101* (2013.01); *G02B 26/0833* (2013.01); *G02B 27/0955* (2013.01); *G02B 27/108* (2013.01)

(58) Field of Classification Search
CPC .............. G02B 26/101; G02B 26/0833; G02B 27/0955; G02B 27/108; G02B 5/32; G02B 27/0172; G02B 2027/0174
See application file for complete search history.

(56) References Cited

U.S. PATENT DOCUMENTS 9,229,223 B2 1/2016 Fischer et al.
11,125,880 B2 9/2021 Send et al.
(Continued)

FOREIGN PATENT DOCUMENTS

CN 102144182 A 8/2011
CN 107003785 A 8/2017
(Continued)

*Primary Examiner* — Euncha P Cherry
(74) *Attorney, Agent, or Firm* — Li & Cai Intellectual Property (USA) Office

(57) ABSTRACT

An optical engine module including at least two laser sources, collimators, a light combining lens group, an aperture, a beam shaping lens group, a MEMS scanning module, and a beam expansion lens group is provided. The at least two laser sources respectively generate at least two laser beams with different wavelengths. The collimators respectively collimate the at least two laser beams to generate at least two collimated beams. The light combining lens group combines the at least two collimated beams into a combined beam. The aperture filters stray beams of the combined beam. The beam shaping lens group shapes the combined beam to generate a shaped beam with a perfect circle. The MEMS scanning module reflects the shaped beam and scans in horizontal and vertical directions to form a scanning beam. The beam expansion lens group expands the scanning beam into an expanded beam having a predetermined area.

13 Claims, 7 Drawing Sheets

(51) Int. Cl.
    *G02B 27/09*    (2006.01)
    *G02B 27/10*    (2006.01)

(56) References Cited

U.S. PATENT DOCUMENTS

| | | |
|---|---|---|
| 2018/0341170 A1 | 11/2018 | Lim et al. |
| 2019/0121136 A1 | 4/2019 | Pierer et al. |
| 2019/0146224 A1 | 5/2019 | Komori et al. |
| 2020/0132275 A1* | 4/2020 | Yamamoto ........... G02B 5/0284 |

FOREIGN PATENT DOCUMENTS

| | | |
|---|---|---|
| CN | 208922048 U | 5/2019 |
| CN | 110376755 A | 10/2019 |
| TW | 200736662 A | 10/2007 |
| TW | 201510574 A | 3/2015 |
| WO | 2010030575 A2 | 3/2010 |

\* cited by examiner

OPTICAL ENGINE MODULE

CROSS-REFERENCE TO RELATED PATENT APPLICATION

This application claims priority to the U.S. Provisional Patent Application Ser. No. 63/031,588 filed on May 29, 2020 and the U.S. Provisional Patent Application Ser. No. 63/120,206 filed on Dec. 2, 2020, both of which applications are incorporated herein by reference in their entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an optical engine module, and more particularly to an optical engine module capable of improving imaging quality.

BACKGROUND OF THE DISCLOSURE

Augmented reality (AR) is a technology that calculates a position and an angle of a camera in real time and adds corresponding images, videos, and 3D models. Wearable devices that implement the AR technology can have a variety of optical display methods, in which waveguide-based AR headsets have the capability of becoming lighter, thinner and more penetrable, and are thus considered to be one of the mainstreams for future implementation of the AR technology.

A waveguide-based AR headset system generally includes a projection part and a waveguide part. Currently, the projection part mainly uses a laser beam scanning (LBS) technology, which has high efficiency and low performance, and is more conducive to complete a head-mounted device display with waveguide enhancement.

A holographic optical element (HOE) can be used in the waveguide part. A scanning beam of the LBS can directly enter the HOE and form a two-dimensional virtual image that has the same field of view (FOV) as the scanning beam of the LBS. A design of an LBS optical engine may vary due to designs or requirements of the HOE. However, a poor optical engine design can not only affect imaging quality, but may also bring about disadvantages of having a smaller FOV or causing stray light to appear in a scanned image and affecting the imaging.

SUMMARY OF THE DISCLOSURE

In response to the above-referenced technical inadequacies, the present disclosure provides an optical engine module that can improve imaging quality.

In one aspect, the present disclosure provides an optical engine module, which includes at least two laser sources, a plurality of collimators, a light combining lens group, an aperture, a beam shaping lens group, a microelectromechanical system (MEMS) scanning module and a beam expansion lens group. The at least two laser sources are configured to respectively generate at least two laser beams with different wavelengths. The plurality of collimators are used for collimating the at least two laser beams to generate at least two collimated beams, respectively. The light combining lens group is used for combining the at least two collimated beams into a combined beam, in which the combined beam has a first light shape, and the first light shape is an ellipse having a first length in a first major axis direction and a second length in a first minor axis direction. The aperture has a light hole, which is used for filtering out stray beams of the combined beam. The beam shaping lens group is used for shaping the first light shape of the combined beam along the first minor axis direction to generate a shaped beam having a second light shape. The second light shape is a perfect circle, and the first length is used as a diameter of the perfect circle. The MEMS scanning module is used for reflecting the shaped beam and scanning in a horizontal direction and a vertical direction to form a scanning beam. The beam expansion lens group is used for expanding the scanning beam into an expanded beam having a predetermined area.

Therefore, the optical engine module provided by the present disclosure has a beam shaping lens group that can shape the laser beams from an ellipse into a circle after the laser beams are collimated and combined, so as to avoid an issue of poor beam shaping due to a divergence angle tolerance of the laser sources (which can affect the final imaging quality). Furthermore, the beam shaping lens group of the present disclosure is arranged before, not after, the MEMS scanning module, which can avoid a reduced FOV that is detrimental to a final imaging result.

In addition, in the present disclosure, the beam expansion lens group performs beam expansion after the scanning beam is generated by the MEMS scanning module, such that the imaging quality is improved by increasing a diameter and parallelism of the scanning beam. At the same time, the beam expansion lens group does not perform the beam expansion on the laser beam before said laser beam enters the MEMS scanning module, so as to prevent the expanded beam from being larger than a size of a vertical mirror and a horizontal mirror of the MEMS scanning module. In this way, there is no occurrence of stray light.

Furthermore, in the present disclosure, a combined structure of the aperture and the beam shaping lens group shapes the combined beam passing through the light combining lens group from an ellipse into a circle. Therefore, a better imaging quality can be achieved when the optical engine module outputs a beam with a perfect circular light shape on a holographic optical engine (HOE), and a grid phenomenon is not likely to occur.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
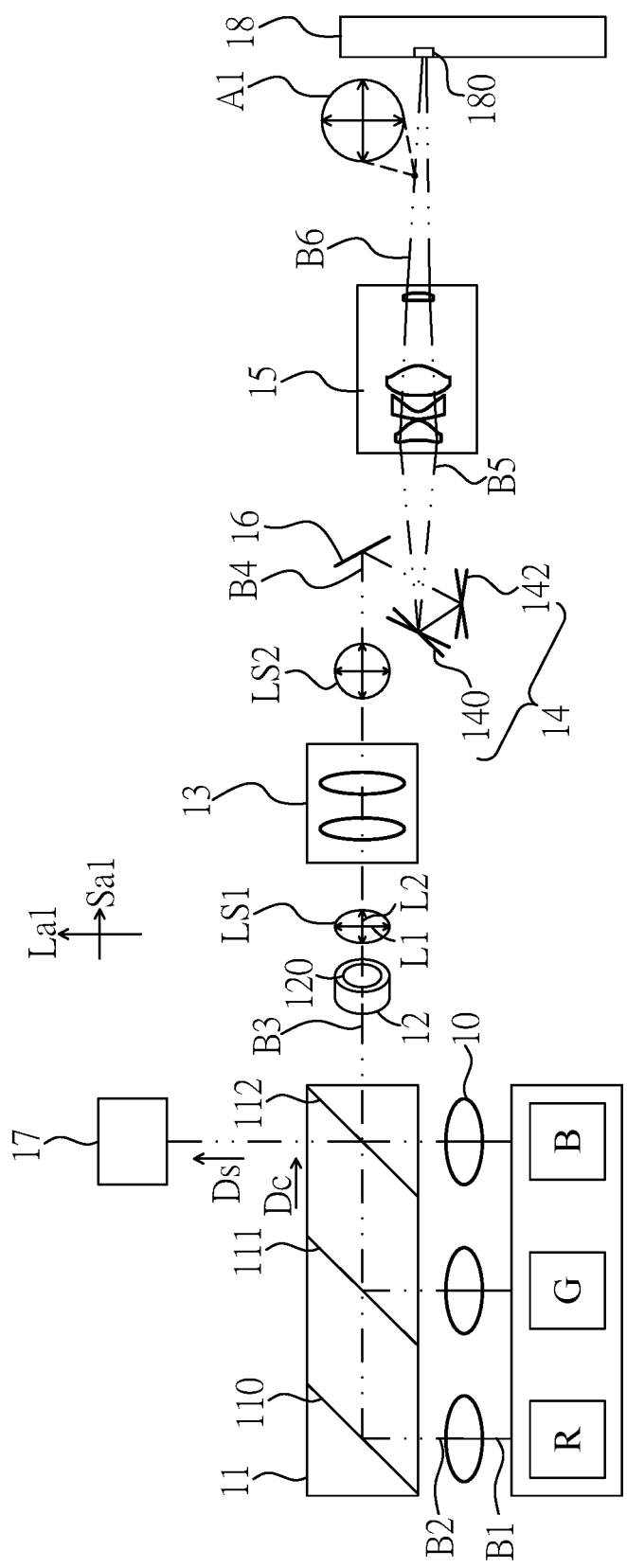
FIG. 1 is a schematic structural diagram of an optical engine module according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

FIG. 1 is a schematic structural diagram of an optical engine module according to an embodiment of the present disclosure. Referring to FIG. 1, an embodiment of the present disclosure provides an optical engine module 1, which includes laser sources R, G, B, a plurality of collimators 10, a light combining lens group 11, an aperture 12, a beam shaping lens group 13, a microelectromechanical system (MEMS) scanning module 14 and a beam expansion lens group 15. The beam shaping lens group 13 and the beam expansion lens group 15 may each be a relay lens. The relay lens usually includes at least two lenses, and the at least two lenses may be ordinary spherical lenses or aspheric lenses.

The laser sources R, G, and B respectively represent laser sources of different colors, which can be red, green, and blue laser diodes, but a selection and a configuration thereof are not limited thereto. FIG. 1 is merely an example of the embodiment. The laser sources R, G, and B are configured to respectively generate a plurality of laser beams B1 with different wavelengths. Since the plurality of laser beams B1 are divergent lights, the laser sources R, G, and B each correspond to one of the collimators 10, and these collimators 10 are used to respectively collimate the plurality of laser beams B1 to generate a plurality of collimated beams B2. It should be noted that while the plurality of collimators 10 are used, since the plurality of laser beams B1 of the laser sources R, G, and B have different divergence angles, the plurality of collimated beams B2 with different areas will be formed after collimations are performed. Although this embodiment describes the three laser sources R, G, and B, such a configuration is provided for illustration purposes only, and a number of the laser sources can be at least two.

The light combining lens group 11 is used to combine the collimated beams B2 into a combined beam B3. The light combining lens group 11 can, for example, include three coated inclined surfaces 110, 111, and 112 of 45-degree angle for combining the collimated beam B2 into the combined beam B3, and outputting the combined beam B3 in a combined light direction Dc. The light combining lens group 11 further outputs a part of the combined beam B3 to a light detector 17 in a light splitting direction Ds through the coating inclined surface 112. In detail, the light detector 17 can be, for example, a photodiode. The coated inclined surface 112 can additionally split the combined beam B3 with lower energy for the light detector 17 to detect, and a detection result can be used to control a screen presentation of the optical engine module 1. Furthermore, coating parameters of the coating inclined surfaces 110, 111 and 112 can be adjusted according to output energy of the laser sources R, G, B and a receiving energy range of the light detector 17. The coating parameters can include film thickness, transmittance, reflectance and other parameters.

In addition, the combined beam B3 output by the light combining lens group 11 has a first light shape LS1, and the first light shape LS1 is an ellipse. It should be noted that since the laser beams B1 of the laser sources R, G, and B have different divergence angles in different directions, the first light shape LS1 will be a non-perfect circular ellipse. As shown in FIG. 1, the ellipse has a first length L1 in a first major axis direction La1 and a second length L2 in a first minor axis direction Sa1.

Figure 2:
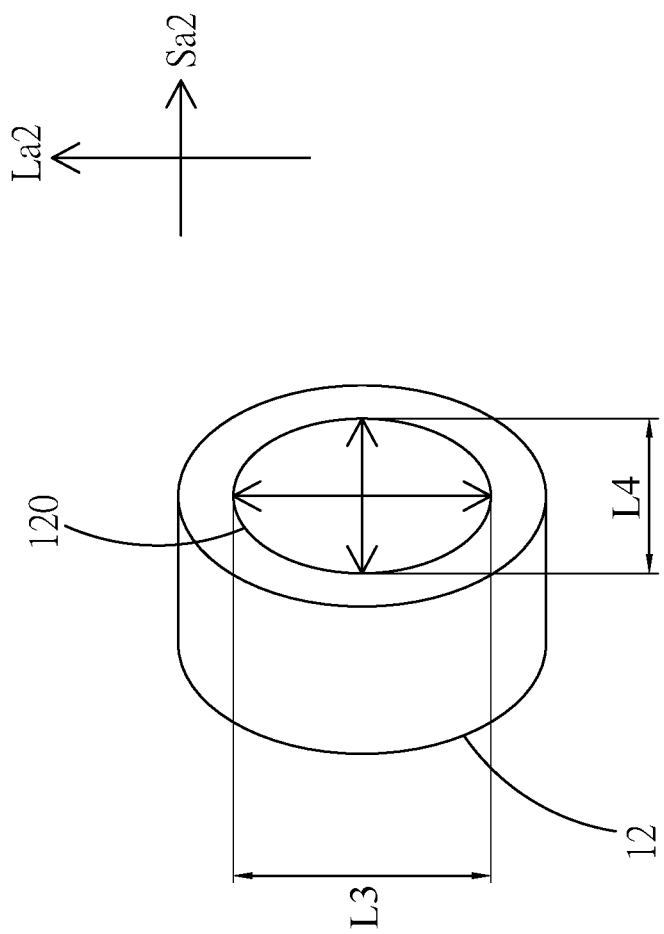
FIG. 2 is a schematic diagram of an aperture according to one embodiment of the present disclosure.

The aperture 12 has a light hole 120 with a diameter range of about 0.7 mm to 0.9 mm, which can be adjusted according to an amount of stray light, and is used to filter out stray beams of the combined beam B3. Reference is further made to FIG. 2, which is a schematic diagram of an aperture according to an embodiment of the present disclosure. As shown in FIG. 2, the light hole 120 of the aperture 12 has a third length L3 in a second major axis direction La2 and a fourth length L4 in a second minor axis direction Sa2.

The second major axis direction La2 needs to be designed to be the same as the first major axis direction La1, and the second minor axis direction Sa2 is also the same as the first minor axis direction Sa1. Since the light hole 120 is used to filter out the stray beams of the combined beam B3, theoretically speaking, a size of the light hole 120 needs to be slightly larger than a size of the first light shape LS1. Therefore, the third length L3 is greater than the first length L1. The third length L3 can be in a range from 0.7 mm to 0.9 mm, and can be adjusted according to the amount of the stray light of the combined beam B3. In a preferred embodiment of the present disclosure, when the first length L1 is, for example, 0.8 mm, and the second length L2 is, for example, 0.6 mm, the third length L3 can be 0.9 mm, and the fourth length L4 can be 0.45 mm. Since the stray light can be filtered out, for the aperture 12, an issue of poor beam shaping due to a divergence angle tolerance of the laser sources R, G, and B can be avoided, and final imaging quality is thus not affected.

The beam shaping lens group 13 is used to shape the first light shape LS1 of the combined beam B3 along the first minor axis direction Sa1, so as to generate a shaped beam B4 having a second light shape LS2. The second light shape LS2 is a perfect circle having the first length L1 as a diameter. For example, the so-called shaping along the first minor axis direction Sa1 refers to shaping the first light shape LS1 of the combined beam B3 into the second light shape LS2 along the first minor axis direction Sa1 by a magnification factor, and the magnification factor is a ratio of the second length L2 to the first length L1.

It should be noted that after experimental assembly and testing, it is found that if the optical engine module outputs an elliptical light beam on a holographic optical engine (HOE), the imaging quality will not be ideal, and a grid phenomenon is likely to occur. Therefore, in the embodiment of the present disclosure, a combined structure of the aperture 12 and the beam shaping lens group 13 shapes the combined beam B3 passing through the light combining lens group 11 from an ellipse into a circle.

Figure 3:
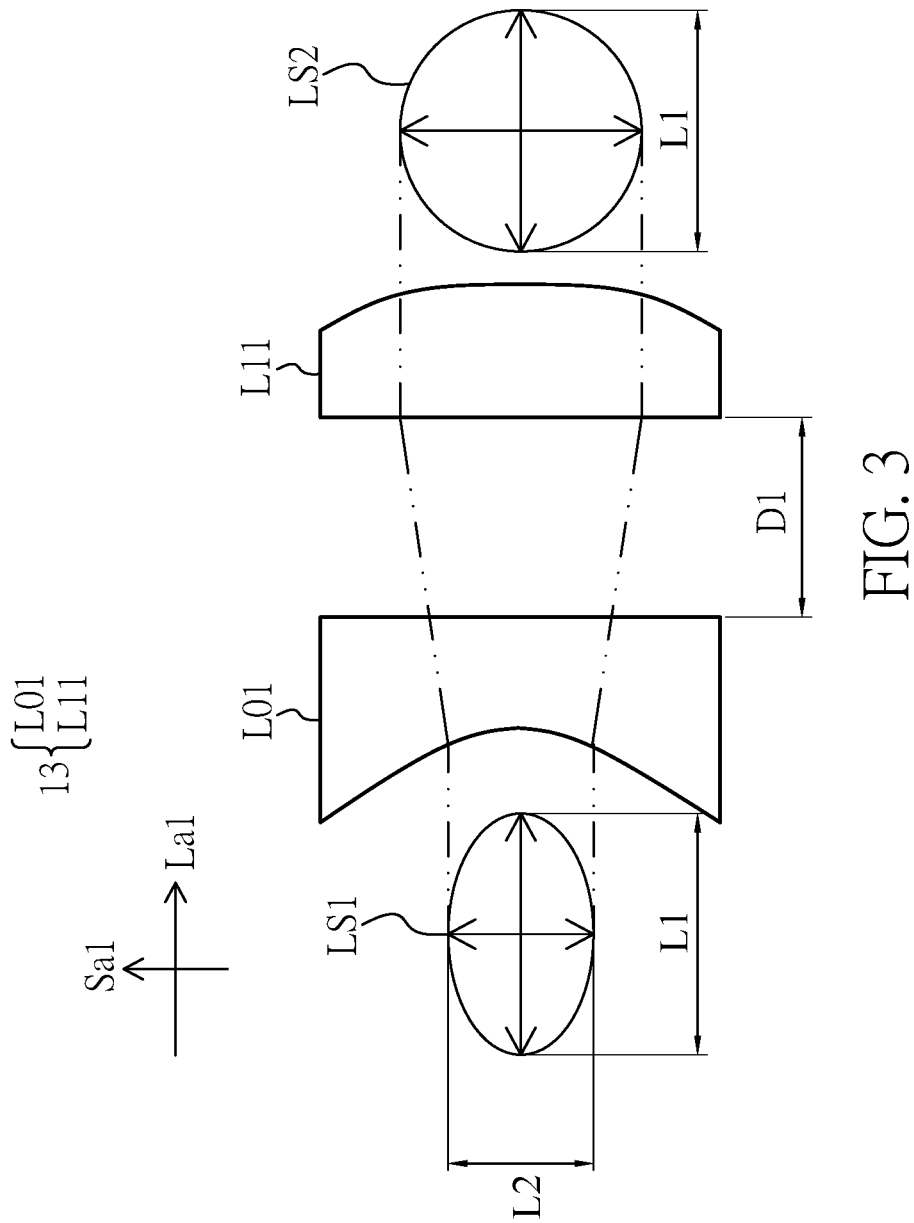
FIG. 3 is a schematic diagram of a structure of a beam shaping lens group according to one embodiment of the present disclosure.

Further reference can be made to FIG. 3, which is a schematic diagram of the structure of a beam shaping lens group according to an embodiment of the present disclosure. As shown in FIG. 3, for example, the beam shaping lens group 13 can include a first concave lens L01 and a first convex lens L11. The first concave lens L01 is used to receive the combined beam B3, the first convex lens L11 is used to output the shaped beam B4, the first concave lens L01 and the first convex lens L11 are separated by a first distance D1, and the first distance D1 is equal to a focal length of the first convex lens L11. It should be noted that the first distance D1 is determined by the aforementioned magnification factor (i.e., determined by a ratio of the first length L1 to the second length L2). In addition, surface combinations of the first concave lens L01 and the first convex lens L11 are concave, flat, flat, and convex surfaces, respectively. It is conceivable that the surface combinations of the first concave lens L01 and the first convex lens L11 can also be flat, concave, convex, and flat surfaces. Diameters, thicknesses, curvatures, shapes, number of lenses and other parameters of the beam shaping lens group 13 can be combined and changed according to an actual design.

Figure 4:
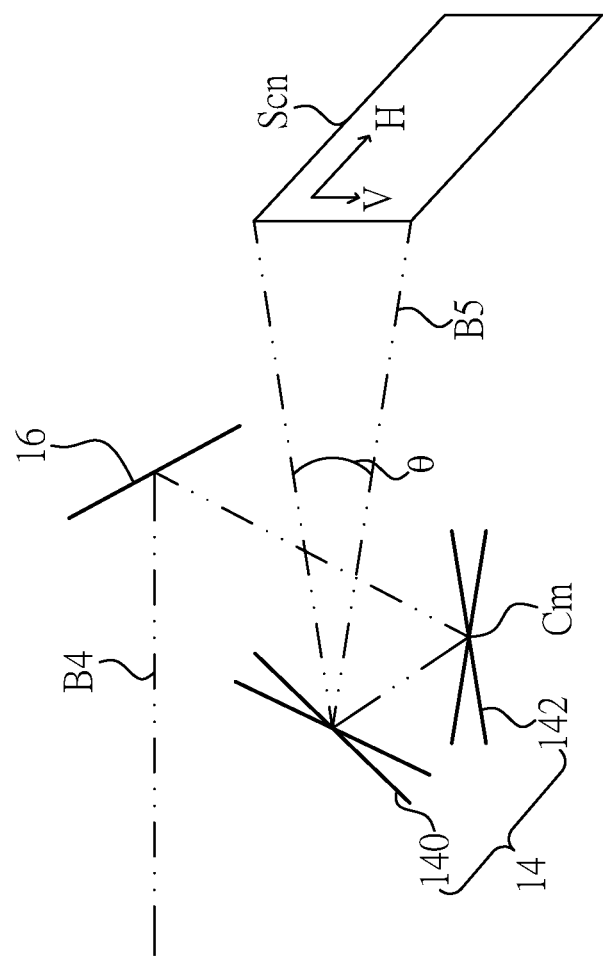
FIG. 4 is a schematic structural diagram of a MEMS scanning module according to one embodiment of the present disclosure.

The MEMS scanning module 14 is used for reflecting the shaped beam B4 and scanning in a horizontal direction H and a vertical direction V to form a scanning beam B5. Reference can be further made to FIG. 4, which is a schematic structural diagram of a MEMS scanning module according to an embodiment of the present disclosure. For example, the MEMS scanning module 14 includes a vertical mirror 140 and a horizontal mirror 142, which are respectively used to reflect the shaped beam B4 and scan in the horizontal direction H and the vertical direction V to form the scanning beam B5. In more detail, an imaging frame Scn is schematically shown in FIG. 4, the vertical mirror 140 has a vibration mechanism for scanning along the vertical direction V to form one of rows of the imaging frame Scn, and the horizontal mirror 142 also has a vibration mechanism for scanning along the horizontal direction H to form one of columns of the imaging frame Scn. The vertical mirror 140 and the horizontal mirror 142 can cooperate to form a complete imaging frame Scn. It should be understood that FIG. 4 is only an example, and an arrangement sequence of the vertical mirror 140 and the horizontal mirror 142 is not limited thereto. In the above description, details of the subsequent beam expansion lens group and incidence into the HOE are omitted.

In addition, the MEMS scanning module 14 has a scanning angle θ, which is defined as an angular variation range of an exit angle at which the scanning beam B5 is output from the MEMS scanning module 14. It should be noted that the scanning angle θ substantially corresponds to a field of view (FOV) of when the imaging frame Scn is output. The beam shaping lens group 13 of the present disclosure is arranged before, not after, the MEMS scanning module 14, which can avoid a reduced FOV that is detrimental to the final imaging result.

On the other hand, referring to FIG. 1 and FIG. 4, in some embodiments, the optical engine module 1 further includes a reflector 16 that can be used to reflect the combined beam B3 to the vertical mirror 140 or the horizontal mirror 142, and can also be used to compensate a tolerance of the optical engine module 1, so that the shaped beam B4 is projected to a center Cm of the reflector 16 of the MEMS scanning module 14. Preferably, a placement angle of the reflector 16 should be sufficient to reflect the shaped beam B4 to the center Cm of the vertical reflector 140 or the horizontal reflector 142. However, the reflector 16 is not a necessary structure. The shaped beam B4 can be directly incident to the MEMS scanning module 14. In addition, a designer can also adjust an optical path through the reflector 16 according to mechanical requirements, and a number of the reflector 16 is not limited to one.

It should be noted that areas of the vertical mirror 140 and the horizontal mirror 142 are at least larger than an area of the second light shape LS2. Moreover, in the beam shaping lens group 13, the first distance D1 is further determined by the areas of the vertical mirror 140 and the horizontal mirror 142.

Further, the beam expansion lens group 15 is used to expand the scanning beam B5 into an expanded beam B6 having a predetermined area A1. An expansion magnification can be 1.2 times, 1.5 times, 2.0 times, and so on. A size of the expanded beam B6 can be between 0.8 mm and 3 mm, which can be changed and adjusted according to requirements of a beam size for different HOEs, and the present disclosure is not limited thereto. Diameters, thicknesses, curvatures, shapes, number of lenses and other parameters of the beam expansion lens group 15 can be combined and changed according to an actual design. The expanded beam B6 is used to output to an input coupling zone 180 of a holographic optical element (HOE) 18, and the predetermined area A1 corresponds to an area of the input coupling zone 180. In detail, in the present disclosure, a combined structure of the aperture 12 and the beam shaping lens group 13 shapes the combined beam B3 passing through the light combining lens group 11 from an ellipse into a circle. Therefore, a better imaging quality can be achieved when the optical engine module 1 outputs a beam with a perfect circular light shape on the holographic optical engine (HOE) 18, and thus the grid phenomenon is not likely to occur.

In detail, the beam expansion lens group 15 can include a plurality of lenses, a number of these lenses is greater than or equal to two, and the lenses are selected from a group consisting of a concave lens, a convex lens, a spherical lens, and an aspheric lens, but the present disclosure is not limited thereto.

Figure 5:
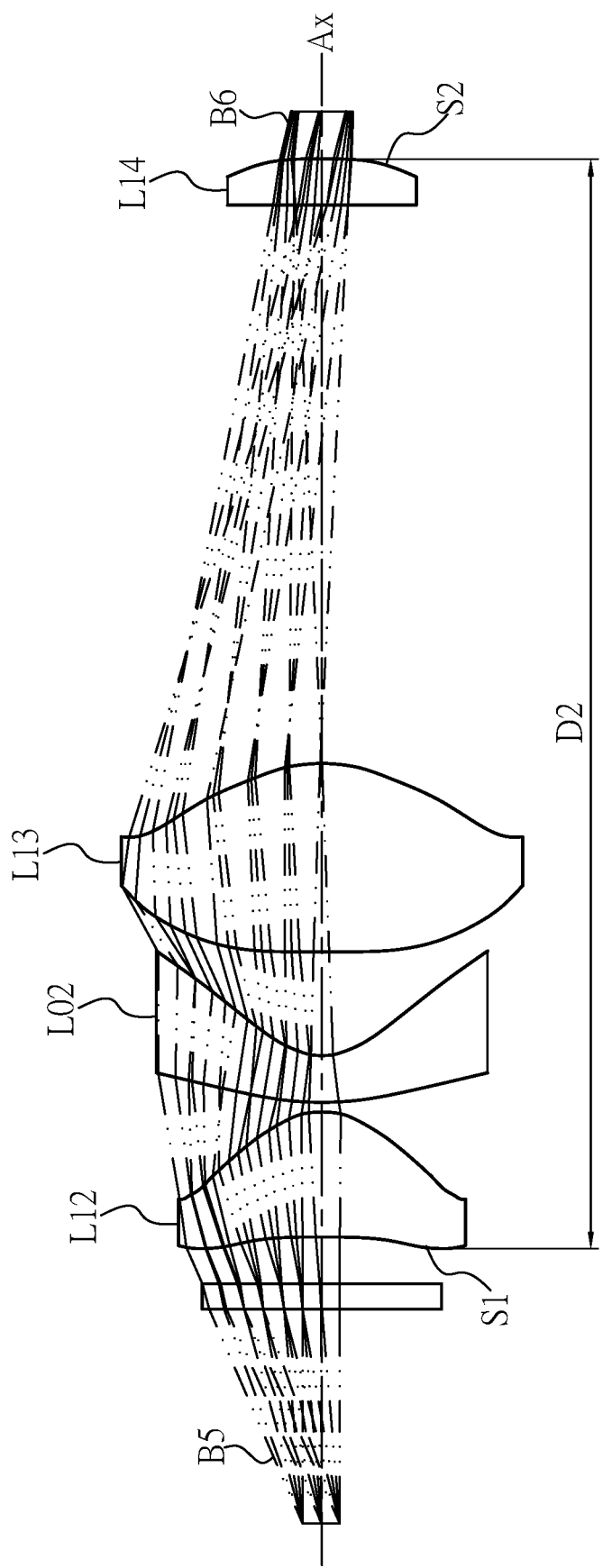
FIG. 5 is a schematic diagram illustrating a structure of a beam expansion lens group according to one embodiment of the present disclosure.

Further reference can be made to FIG. 5, which is a schematic diagram illustrating a structure of a beam expansion lens group according to an embodiment of the present disclosure. As shown in FIG. 5, the beam expansion lens group 15 includes, for example, four lenses, which are a second convex lens L12, a second concave lens L02, a third convex lens L13, and a fourth convex lens L14 arranged in sequence along an optical axis Ax. The second convex lens L12 has a first receiving surface S1 for receiving the scanning beam B5, and the fourth convex lens L14 has a first output surface S2 for outputting the expanded beam B6. In this embodiment, the first receiving surface S1 and the first output surface S2 are separated by a second distance D2, and the second distance D2 is inversely proportional to the scanning angle θ of the MEMS scanning module 14. In more detail, as shown in FIG. 5, first three lenses in the beam expansion lens group 15, i.e., the second convex lens L12, the second concave lens L02, and the third convex lens L13, are used to expand rays of each field of view of the combined beam B3. A last lens, i.e., the fourth convex lens L14, is used to make the expanded rays of each field of view parallel to each other, so as to achieve parallel lights.

Figure 6:
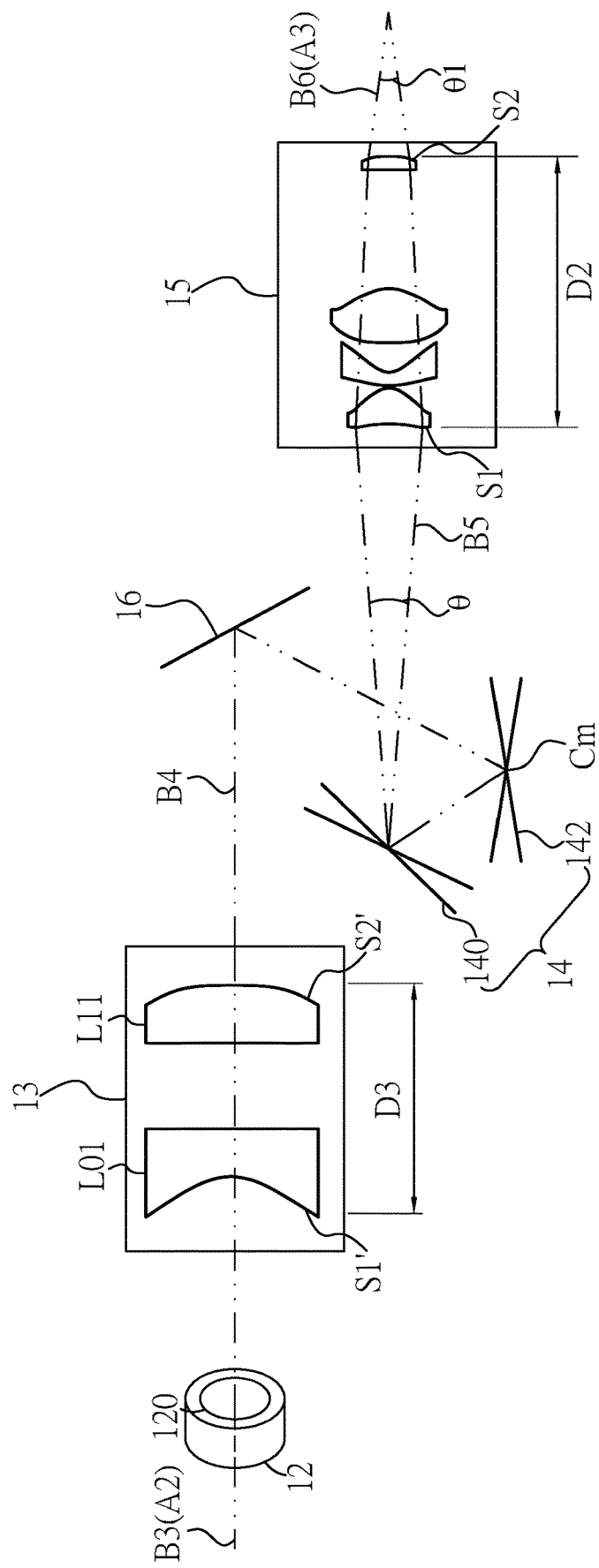
FIG. 6 is a schematic structural diagram illustrating the aperture, the beam shaping lens group, the MEMS scanning module, and the beam expansion lens group according to one embodiment of the present disclosure.

In addition, the aperture 12, the beam shaping lens group 13, the MEMS scanning module 14, and the beam expansion lens group 15 also need to be designed in consideration of dimensions of one another. Reference is made to FIG. 6, which is a schematic diagram illustrating a structure of the aperture, the beam shaping lens group, the MEMS scanning module, and the beam expansion lens group according to an embodiment of the present disclosure.

As shown in FIG. 6, a field of view θ1 will be determined according to the scanning angle θ of the MEMS scanning module 14. When the scanning angle θ is larger, the second distance D2 between the first receiving surface S1 and the first output surface S2 of the beam expansion lens group 15 can be shorter. For example, when the scanning angle θ is 40 degrees and the second distance D2 is a predetermined value, the field of view θ1 is 40 degrees. However, when the scanning angle θ is reduced to 30 degrees and the second distance D2 is maintained at the predetermined value, the field of view θ1 is correspondingly reduced to 30 degrees. When the scanning angle θ is 40 degrees and the second distance D2 is changed to be greater than the predetermined value, the field of view θ1 is less than or equal to 40 degrees.

In the embodiment of FIG. 6, the beam shaping lens group 13 is the same as that of the embodiment of FIG. 3, which includes a first concave lens L01 and a first convex lens L11. The first concave lens L01 has a first focal length, and the first convex lens L11 has a second focal length. The first concave lens L01 has a second receiving surface S1' for receiving the combined beam B3, and the first convex lens L11 has a second output surface S2' for outputting the shaped beam B4. In this embodiment, the second receiving surface S1' and the second output surface S2' are separated by a third distance D3, and a sum of the first focal length and the second focal length is equal to the third distance D3. The expanded beam B6 has an area A3, which needs to be designed correspondingly to an area A2 of the combined beam B3. Preferably, a ratio of the area A2 to the area A3 is equal to a ratio of the first focal length to the second focal length.

In the above configuration, the beam expansion lens group 15 performs beam expansion after the scanning beam B5 is generated by the MEMS scanning module 14, such that the imaging quality is improved by increasing a diameter and parallelism of the scanning beam B5, which can also avoid using the beam expansion lens group 15 to perform the beam expansion on the laser beam before it enters the MEMS scanning module 14, so as to prevent the expanded beam B6 from being larger than the size of the vertical mirror 140 and the horizontal mirror 142 of the MEMS scanning module 14. In this way, there is no occurrence of stray light.

Figure 7:
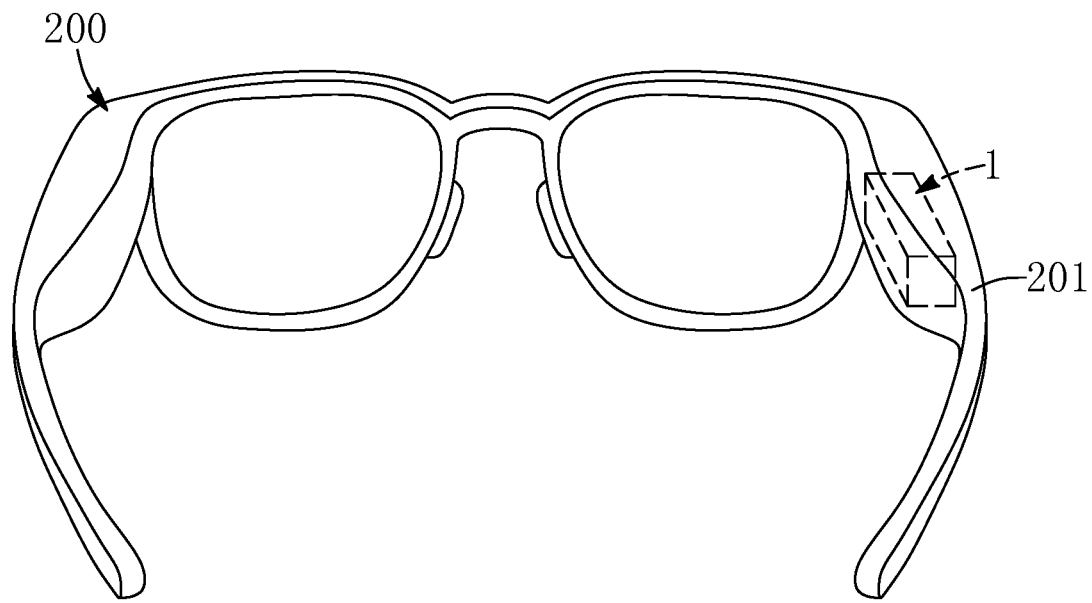
FIG. 7 is a three-dimensional schematic diagram of the optical engine module being applied to smart glasses according to one embodiment of the present disclosure.

Reference is further made to FIG. 7, which is a three-dimensional schematic diagram of an optical engine module according to an embodiment of the present disclosure applied to smart glasses. As shown in FIG. 7, the optical engine module 1 described from FIG. 1 to FIG. 6 can be applied to smart glasses 1000, and the smart glasses 1000 can be, for example, augmented reality (AR) glasses. In addition, the optical engine module 1 can be disposed in one of temples 201 of a frame 200, but the present disclosure is not limited thereto.

In conclusion, the optical engine module provided by the present disclosure has a beam shaping lens group that can shape the laser beams from an ellipse into a circle after the laser beams are collimated and combined, so as to avoid an issue of poor beam shaping due to a divergence angle tolerance of the laser sources (which can affect the final imaging quality). Furthermore, the beam shaping lens group of the present disclosure is arranged before, not after, the MEMS scanning module, which can avoid a reduced FOV that is detrimental to a final imaging result.

In addition, in the present disclosure, the beam expansion lens group performs beam expansion after the scanning beam is generated by the MEMS scanning module, such that the imaging quality is improved by increasing a diameter and parallelism of the scanning beam. At the same time, the beam expansion lens group does not perform the beam expansion on the laser beam before said laser beam enters the MEMS scanning module, so as to prevent the expanded beam from being larger than the size of the vertical mirror and the horizontal mirror of the MEMS scanning module. In this way, there is no occurrence of stray light.

Furthermore, in the present disclosure, a combined structure of the aperture and the beam shaping lens group shapes the combined beam passing through the light combining lens group from an ellipse into a circle. Therefore, a better imaging quality can be achieved when the optical engine module outputs a beam with a perfect circular light shape on the HOE, and a grid phenomenon is not likely to occur.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:
1. An optical engine module, comprising:
   at least two laser sources configured to respectively generate at least two laser beams with different wavelengths;
   a plurality of collimators for collimating the at least two laser beams to generate at least two collimated beams, respectively;
   a light combining lens group for combining the at least two collimated beams into a combined beam, wherein the combined beam has a first light shape, and the first light shape is an ellipse having a first length in a first major axis direction and a second length in a first minor axis direction;

an aperture having a light hole for filtering out stray beams of the combined beam;

a beam shaping lens group for shaping the first light shape of the combined beam along the first minor axis direction to generate a shaped beam having a second light shape, wherein the second light shape is a perfect circle, and the first length is used as a diameter of the perfect circle;

a microelectromechanical system (MEMS) scanning module for reflecting the shaped beam and scanning in a horizontal direction and a vertical direction to form a scanning beam; and a beam expansion lens group for expanding the scanning beam into an expanded beam having a predetermined area.

2. The optical engine module according to claim 1, wherein the beam shaping lens group includes a first concave lens and a first convex lens, the first concave lens is used for receiving the combined beam, the first convex lens is used for outputting the shaped beam, the first concave lens is separated from the first convex lens by a first distance, and the first distance is equal to a focal length of the first convex lens.

3. The optical engine module according to claim 2, wherein the beam shaping lens group shapes the combined beam along the first minor axis direction into the second light shape by a magnification factor, the magnification factor is a ratio of the second length to the first length, and the first distance is determined by the magnification factor.

4. The optical engine module according to claim 2, wherein the first concave lens has a first focal length, the first convex lens has a second focal length, the first concave lens has a second receiving surface for receiving the combined beam, the first convex lens has a second output surface for outputting the shaped beam, the second receiving surface is separated from the second output surface by a third distance, and the third distance equals the first focal length plus the second focal length;

wherein the combined beam has a first area, the expanded beam has a second area, and a ratio of the first area to the second area is equal to a ratio of the first focal length to the second focal length.

5. The optical engine module according to claim 1, wherein the MEMS scanning module includes a vertical mirror and a horizontal mirror, which are respectively used to reflect the shaped beam and scan in the horizontal direction and the vertical direction to form the scanning beam.

6. The optical engine module according to claim 5, further comprising a reflector for reflecting the combined beam to the vertical mirror or the horizontal mirror.

7. The optical engine module according to claim 5, wherein areas of the vertical mirror and the horizontal mirror are at least larger than an area of the second light shape, and the first distance is further determined by the areas of the vertical mirror and the horizontal mirror.

8. The optical engine module according to claim 1, wherein the expanded beam is output to an input coupling zone of a holographic optical element, and the predetermined area corresponds to an area of the input coupling zone.

9. The optical engine module according to claim 1, wherein the light hole of the aperture has a third length in a second major axis direction and a fourth length in a second minor axis direction, the second major axis direction is the same as the first major axis direction, and the third length is greater than the first length.

10. The optical engine module according to claim 1, wherein the beam expansion lens group includes a plurality of lenses, a number of the plurality of lenses is greater than or equal to two, and the plurality of lenses are selected from a group consisting of a concave lens, a convex lens, a spherical lens and an aspheric lens.

11. The optical engine module according to claim 10, wherein the beam expansion lens group includes a second convex lens, a second concave lens, a third convex lens, and a fourth convex lens arranged in sequence along an optical axis, and wherein the second convex lens has a first receiving surface for receiving the scanning beam, and the fourth convex lens has a first output surface for outputting the expanded beam.

12. The optical engine module according to claim 11, wherein the first receiving surface and the first output surface are separated by a second distance, and the second distance is inversely proportional to a scanning angle of the MEMS scanning module, and wherein the scanning angle is an angular variation range of an exit angle at which the scanning beam is output from the MEMS scanning module.

13. The optical engine module according to claim 1, further comprising a light detector, wherein the light combining lens group combines the at least two collimated beams into the combined beam and outputs the combined beam in a combined light direction, and the light combining lens group further outputs a portion of the combined beam to the light detector in a light splitting direction.

* * * * *